US012170947B2

United States Patent
Tiwari et al.

(10) Patent No.: US 12,170,947 B2
(45) Date of Patent: Dec. 17, 2024

(54) METHOD AND APPARATUS FOR MANAGING CLOSED ACCESS GROUP INFORMATION

(71) Applicant: Samsung Electronics Co., Ltd., Suwon-si (KR)

(72) Inventors: Kundan Tiwari, Bihar (IN); Lalith Kumar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/622,164

(22) PCT Filed: Jun. 24, 2020

(86) PCT No.: PCT/KR2020/008224
§ 371 (c)(1),
(2) Date: Dec. 22, 2021

(87) PCT Pub. No.: WO2020/262956
PCT Pub. Date: Dec. 30, 2020

(65) Prior Publication Data
US 2022/0345989 A1 Oct. 27, 2022

(30) Foreign Application Priority Data

Jun. 24, 2019 (IN) .............................. 201941025046
Jun. 18, 2020 (IN) .............................. 201941025046

(51) Int. Cl.
*H04W 48/02* (2009.01)
*H04W 48/08* (2009.01)
(Continued)

(52) U.S. Cl.
CPC ........... *H04W 48/02* (2013.01); *H04W 48/08* (2013.01); *H04W 60/00* (2013.01); *H04W 84/042* (2013.01)

(58) Field of Classification Search
CPC ..... H04W 48/02; H04W 48/08; H04W 60/00; H04W 84/042; H04W 8/18
See application file for complete search history.

(56) References Cited

U.S. PATENT DOCUMENTS 8,918,112 B2  12/2014  Khandekar et al.
9,456,336 B2   9/2016  Prakash et al.
(Continued)

FOREIGN PATENT DOCUMENTS

CN  101911782 A  12/2010
CN  105532039 A   4/2016
(Continued)

OTHER PUBLICATIONS

Samsung, "Resolution of Editor's note on privacy impact in Solution #3", 3GPP TSG SA WG3 (Security) Meeting #95, Reno, US, May 6-10, 2019, S3-191768, 3 pages. (Year: 2019).*
(Continued)

*Primary Examiner* — Thinh D Tran (57) ABSTRACT

Embodiments herein provide a method for managing CAG information. The method includes receiving, by an Access and Mobility Management Function (AMF), a registration request message from a User Equipment (UE) through a cell for registering to a network. Further, the method includes determining, by the AMF, that the UE is one of unauthorized to the cell when the cell is a CAG cell, and authorized to access the network only through a CAG cell when the cell is a non-CAG cell. Further, the method includes sending, by the AMF, a registration reject message to the UE, where the registration reject message includes a CAG information list.

6 Claims, 3 Drawing Sheets

(51) Int. Cl.
  *H04W 60/00* (2009.01)
  *H04W 84/04* (2009.01)

(56) References Cited

U.S. PATENT DOCUMENTS

| | | | |
|---|---|---|---|
| 10,880,835 | B2 | 12/2020 | Wang et al. |
| 2015/0172926 | A1 | 6/2015 | Buchmayer et al. |
| 2018/0227873 | A1 | 8/2018 | Vrzic et al. |
| 2022/0201482 | A1* | 6/2022 | Ferdi .................... H04L 63/126 |
| 2022/0225098 | A1 | 7/2022 | Guo |

FOREIGN PATENT DOCUMENTS

| | | |
|---|---|---|
| CN | 109906638 A | 6/2019 |
| WO | 2021/063115 A1 | 4/2021 |

OTHER PUBLICATIONS

Nokia, et al., "S5GMM cause value for CAG," C1-193510, 3GPP TSG-CT WG1 Meeting #117, Reno, Nevada, USA, May 13-17, 2019, 24 pages. (Year: 2019).*

Oppo, "Introducing support for Non-Public Networks and operations on Allowed CAG list", 3GPP TSG SA WG2 Meeting #131, Tenerife, Spain, Feb. 25-Mar. 1, 2019, S2-1901613, 10 pages. (Year: 2019).*

Nokia, Nokia Shanghai Bell, "5GMM cause values for CAG", 3GPP TSG-CT WG1 Meeting #117, Reno (NV), USA, May 13-17, 2019 , C1-193353, 24 pages (Year: 2019).*

3GPP TS 23.122 V16.3.0, "Non-Access-Stratum (NAS) functions related to Mobile Station (MS) in idle mode", 3GPP TS 23.122 V16.3.0, Sep. 24, 2019, 75 pages (Year: 2019).*

Nokia et al., "5GMM cause values for CAG", Change Request, 3GPP TSG-CT WG1 Meeting #117, May 13-17, 2019, C1-193353, 24 pages.

Huawei et al., "Discussion on updating CAG information in Registration Reject", 3GPP TSG CT WG1 Meeting #123, Apr. 16-24, 2020, C1-202251, 3 pages.

Supplementary European Search Report dated Jul. 15, 2022 in connection with European Patent Application No. 20 83 3504, 12 pages.

Examination report dated Nov. 9, 2021, in connection with Indian Application No. 201941025046, 5 pages.

Nokia, et al., "5GMM cause value for CAG," C1-193510, 3GPP TSG-CT WG1 Meeting #117, Reno, Nevada, USA, May 13-17, 2019, 24 pages.

Samsung, "Resolution of Editor's note on privacy impact in Solution #3", 3GPP TSG SA WG3 (Security) Meeting #95, Reno, US, May 6-10, 2019, S3-191768, 3 pages.

Oppo, "Introducing support for Non-Public Networks and operations on Allowed CAG list", 3GPP TSG SA WG2 Meeting #131, Tenerife, Spain, Feb. 25-Mar. 1, 2019, S2-1901613, 10 pages.

Ericsson, "Alignments and corrections to Non-Public Network functionality", 3GPP TSG SA WG2 Meeting #134, Sapporo, Japan, Jun. 24-28, 2019, S2-1907045, 7 pages.

Interdigital, "Solution for (D)DOS attack mitigation in PNI NPN", 3GPP TSG SA WG3 (Security) Meeting #95bis, Sapporo, Japan, Jun. 24-28, 2019, S3-191821, 2 pages.

MediaTek Inc. "NPN: Update and enforcement of new Allowed CAG list and CAG-only indication", 3GPP TSG SA WG2 Meeting #133, Reno, NV, USA, May 13-17, 2019, S2-1906552, 3 pages.

Notification of Transmittal of the International Search Report and the Written Opinion of the International Searching Authority, or the Declaration dated Sep. 28, 2020 in connection with International Patent Application No. PCT/KR2020/008224, 9 pages.

Notice of the First Office Action dated Nov. 23, 2023, in connection with Chinese Application No. 202080046085.0, 12 pages.

Nokia, et al., "5GMM cause values for CAG," C1-193353, 3GPP TSG-CT WG1 Meeting #117, Reno, Nevada, May 13-17, 2019, 25 pages.

Notification of the Second Office Action dated Jun. 28, 2024, in connection with Chinese Patent Application No. 202080046085.0, 9 pages.

Communication pursuant to Article 94(3) EPC dated May 22, 2024, in connection with European Patent Application No. 20833504.2, 6 pages.

* cited by examiner

METHOD AND APPARATUS FOR MANAGING CLOSED ACCESS GROUP INFORMATION

CROSS-REFERENCE TO RELATED APPLICATIONS

This application is a 371 of International Application No. PCT/KR2020/008224 filed on Jun. 24, 2020, which claims priority to India Patent Application No. 201941025046 filed on Jun. 24, 2019, and India Patent Application No. 201941025046 filed on Jun. 18, 2020, the disclosures of which are herein incorporated by reference in their entirety.

BACKGROUND

1. Field

The present disclosure relates to electronic devices, and more specifically to a method and Apparatus for managing Closed Access Group (CAG) information.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and system for managing CAG information.

Another object of the embodiments herein is to determine that a User Equipment (UE) is unauthorized to a CAG cell, in response to receiving a registration request message from the UE through the CAG cell for registering to a network.

Another object of the embodiments herein is to determine that the UE is authorized to access the network only through the CAG cell, in response to receiving the registration request message from the UE through a non-CAG cell for registering to the network.

Another object of the embodiments herein is to send a registration reject message includes a CAG information list to the UE, where the CAG information list includes zero entry or at least one of a Public land mobile network identifier (PLMN ID), an allowed CAG list including zero or more CAG IDs, and an indication to indicate that the UE is only allowed to access the network through the CAG cell.

BRIEF DESCRIPTION OF THE DRAWINGS

This method and apparatus are illustrated in the accompanying drawings, throughout which like reference letters indicate corresponding parts in the various figures. The embodiments herein will be better understood from the following description with reference to the drawings, in which.

DETAILED DESCRIPTION

Accordingly, the embodiments herein provide a method for managing CAG information. The method includes receiving, by an Access and Mobility Management Function (AMF), a registration request message from a User Equipment (UE) through a cell for registering to a network. Further, the method includes determining, by the AMF, that the UE is one of unauthorized to the cell when the cell is a CAG cell, and authorized to access the network only through a CAG cell when the cell is a non-CAG cell. Further, the method includes sending, by the AMF, a registration reject message to the UE, where the registration reject message includes a CAG information list.

In an embodiment, the registration request message is one of an initial registration request and a mobility and periodic registration update request message.

In an embodiment, the CAG information list includes zero entry or at least one of a Public Land Mobile Network Identifier (PLMN ID), an allowed CAG list including zero or more CAG IDs, and an indication to indicate that the UE is only allowed to access the network through the CAG cell.

Accordingly, the embodiments herein provide a method for managing the CAG information. The method includes sending, by the UE, the registration request message to the AMF through the cell for registering to a network. Further, the method includes receiving, by the UE, the registration reject message including the CAG information list from the AMF, in response to determining by the AMF that the UE is one of: unauthorized to the cell when the cell is the CAG cell, and authorized to access the network only through the CAG cell when the cell is the non-CAG cell.

In an embodiment, the UE is operating in one of an automatic network selection mode and a manual network selection mode.

In an embodiment, the method includes storing, by the UE, the CAG information to a memory of the UE or a Universal Integrated Circuit Card (UICC) coupled to the UE.

In an embodiment, the method includes selecting, by the UE, a CAG cell based on the CAG information list received in the registration reject message. Further, the method includes sending, by the UE, a registration request message to the AMF through the CAG cell. Further, the method includes receiving, by the UE, a registration accept message from the AMF.

Accordingly, the embodiments herein provide the AMF for managing the CAG information. The AMF includes a CAG information controller, a memory, and a processor, where the CAG information controller is coupled to the memory and the processor. The CAG information controller is configured to receive the registration request message from the UE through the cell for registering to the network. The CAG information controller is configured to determine that the UE is one of unauthorized to the cell when the cell is the CAG cell, and authorized to access the network only through the CAG cell when the cell is the non-CAG cell. The CAG information controller is configured to send the registration reject message to the UE, where the registration reject message includes the CAG information list.

In an embodiment, the registration request message is one of an initial registration requests and a mobility and periodic registration update request message.

In an embodiment, the CAG information list comprises zero entry or at least one of a Public Land Mobile Network Identifier (PLMN ID), an allowed CAG list comprising zero or more CAG IDs, and an indication to indicate that the UE is only allowed to access the network through the CAG cell.

Accordingly, the embodiments herein provide the UE for managing the CAG information. The UE includes a CAG information controller, a memory, and a processor, where the CAG information controller is coupled to the memory and the processor. The CAG information controller is configured to send the registration request message to the AMF through the cell for registering to the network. The CAG information controller is configured to receive the registration reject message including the CAG information list from the AMF, in response to determining by the AMF that the UE is one of: unauthorized to the cell when the cell is the CAG cell, and authorized to access the network only through the CAG cell when the cell is the non-CAG cell.

In an embodiment, the registration request message is one of an initial registration request and a mobility and periodic registration update request message.

In an embodiment, the UE is operating in one of an automatic network selection mode and a manual network selection mode.

In an embodiment, the CAG information list comprises zero entry or at least one of a Public Land Mobile Network Identifier (PLMN ID), an allowed CAG list comprising zero or more CAG IDs, and an indication to indicate that the UE is only allowed to access the network through the CAG cell.

In an embodiment, the CAG information controller is configured to store the CAG information to the memory of the UE or a Universal Integrated Circuit Card (UICC) coupled to the UE.

In an embodiment, the CAG information controller is configured to: select a CAG cell based on the CAG information list received in the registration reject message, send a registration request message to the AMF through the CAG cell and receive a registration accept message from the AMF.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

A CAG is a group consisting of subscribers who are permitted to access the network through one or more allowed CAG cells allowed to connect. Generally, a User Equipment (UE) of the subscriber of the CAG is pre-configured with CAG information consists of an allowed CAG list and optionally an indication. The allowed CAG list includes the list IDs of the allowed CAG cells. The indication indicates that the UE is allowed to access the network only through a CAG cell. In another method, the network sends the CAG information in a registration accept message during a NAS procedure (e.g. a Registration procedure or a UE configuration update procedure) for registering the UE through a CAG cell. Further, the UE can access the CAG services from the network through an allowed CAG cell in the list of allowed CAG cells.

In an example scenario, a Universal Integrated Circuit Card (UICC) is inserted to the UE for first time, where the UICC includes a Universal Subscriber Identity Module (USIM) application having CAG subscriptions a Universal Integrated Circuit Card (UICC). Consider, the CAG information is not available at the UE. The allowed CAG cell and a non-CAG cell (i.e. a normal cell) of a Public Land Mobile Network (PLMN) are available at a geo-location of the UE. Since, the UE does not have the CAG information (i.e. the indication), the UE accesses the non-CAG cell for sending a registration request message to an Access and Mobility Management Function (AMF) of the network.

Upon receiving the registration request message through the non-CAG cell, the AMF rejects the request of the UE and send a registration reject message as the UE is not supposed to access the non-CAG cell according to the CAG subscription. Further, the UE never registers for the CAG subscription and camps on the CAG cell. Thus, the UE loses the opportunity to access all the CAG services.

In another example scenario, the UE is accessing the CAG services (i.e. PDU sessions) through the allowed CAG cell, where the list of CAG IDs is available at the UE. Consider, the UE reaches to a geo-location where a coverage of the CAG cell is not available. Further, the UE initiates a mobility registration request with the AMF through the non-CAG cell, and receives the indication in the registration reject message from the AMF. Upon receiving the indication, the UE initiates a EU3: ROAMING NOT ALLOWED state, and deletes all the PDU sessions related to the CAG. Further, the CAG services disrupt at the UE. Thus, it is desired to address the above-mentioned shortcomings or at least provide a useful alternative.

Accordingly, the embodiments herein provide a method for managing CAG information. The method includes receiving, by an Access and Mobility Management Function (AMF), a registration request message from a User Equipment (UE) through a cell for registering to a network. Further, the method includes determining, by the AMF, that the UE is one of unauthorized to the cell when the cell is a CAG cell, and authorized to access the network only through a CAG cell when the cell is a non-CAG cell. Further, the method includes sending, by the AMF, a registration reject message to the UE, where the registration reject message includes a CAG information list.

Unlike existing methods and systems, the proposed method allows the UE to obtain the CAG information includes an allowed CAG list and a CAG only indication as a part of the registration reject message from the AMF. The UE uses the CAG information to immediately select and camp on a CAG cell corresponds to a CAG ID in the allowed CAG list and access CAG service as soon as possible.

Moreover, the proposed method allows the UE to immediately know that the UE is only allowed to access the network through the CAG cell by providing the CAG only indication in the registration reject message or a registration accept message to the UE 100. Therefore, the UE 100 does not reselect or select the non-CAG cell and does not lose the CAG services.

Figure 1:
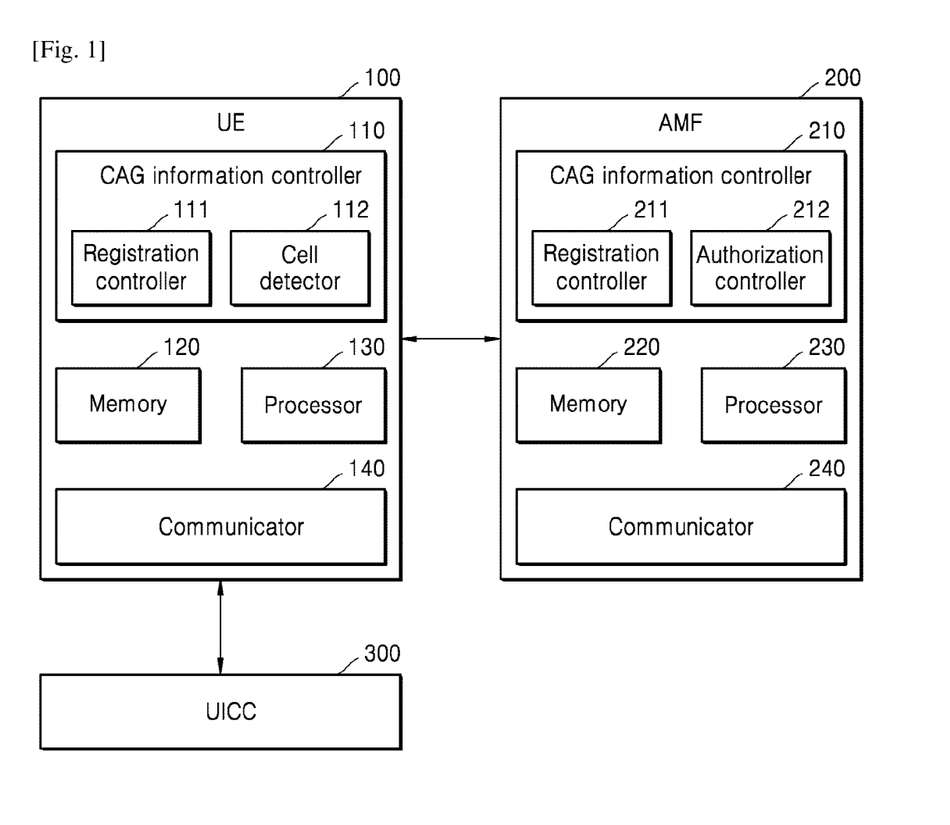
FIG. 1 is a block diagram of a system for managing CAG information, according to an embodiment as disclosed herein.
Figure 2A:
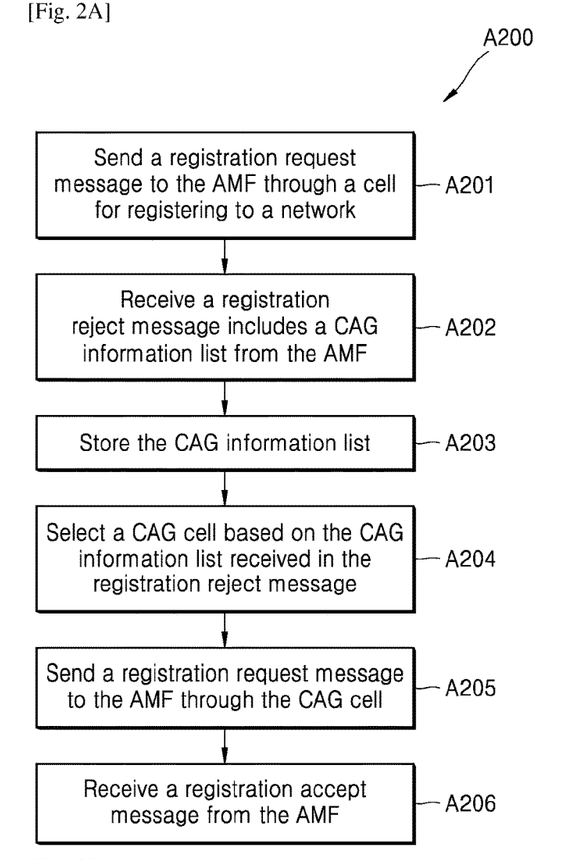
FIG. 2A is a flow diagram illustrating a method of obtaining a CAG information list by a UE from an AMF, according to an embodiment as disclosed herein.
Figure 2B:
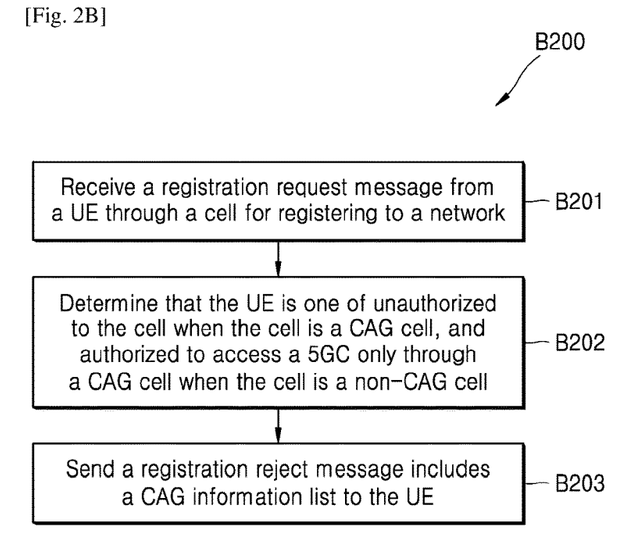
FIG. 2B is a flow diagram illustrating a method for providing the CAG information list by the AMF to the UE, according to an embodiment as disclosed herein.
Figure 3:
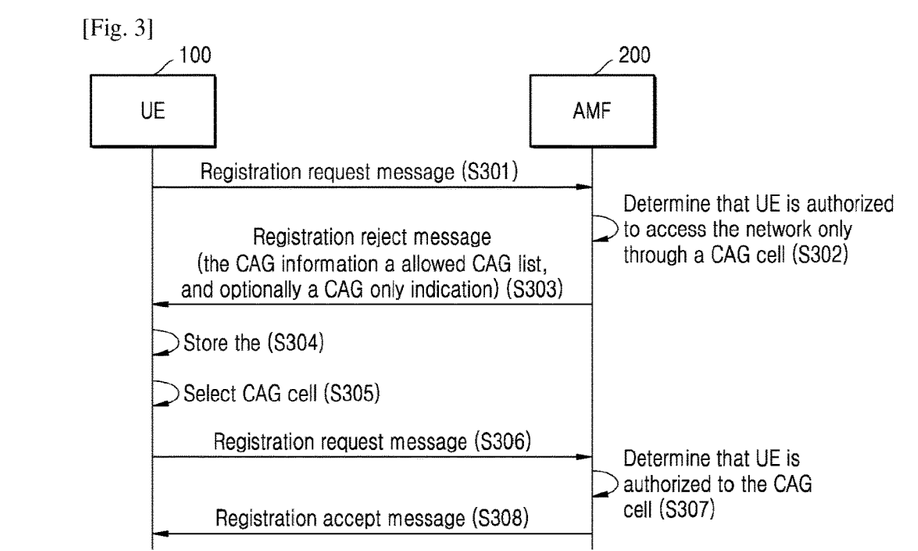
FIG. 3 is a sequential diagram illustrating signaling between the AMF and the UE for managing the CAG information to register the UE to the network, according to an embodiment as disclosed herein.

Referring now to the drawings, and more particularly to FIGS. 1 through 3, there are shown preferred embodiments.

FIG. 1 is a block diagram of a system for managing CAG information, according to an embodiment as disclosed herein. In an embodiment, the system includes a UE (100), an AMF (200), and a Universal Integrated Circuit Card (UICC) (300), where the UICC (300) is coupled to the UE (100). The UICC (300) includes a Universal Subscriber Identity Module (USIM) application having CAG subscriptions. The AMF (200) is a part of a network. Examples for the network are a 5G core network (5GC), a Next Generation-Radio Access Network (NG-RAN), and a 5G system (5GS).

Examples for the UE (100) are, but not limited to a smart phone, a tablet computer, a personal digital assistance (PDA), an Internet of Things (IoT), and the like. In an embodiment, the UE (100) includes a CAG information controller (110), a memory (120), a processor (130), and a communicator (140). In an embodiment, the CAG information controller (110) includes a registration controller (111), and a cell detector (112). In an embodiment, the AMF (200) includes a CAG information controller (210), a memory (220), a processor (230), and a communicator (240). In an embodiment, the CAG information controller (210) includes a registration controller (211), and an authorization controller (212). In an embodiment, the AMF (200) includes a CAG information controller (210), a memory (220), a processor (230), and a communicator (240). In an embodiment, the CAG information controller (210) includes a registration controller (211), and an authorization controller (212).

The CAG information controller (110) is configured to select a cell of a PLMN to camp in response receiving a signal from a base station corresponds to the cell, where the base station is connected to the AMF (200). In an embodiment, the UE (100) operates in an automatic network selection mode or a manual network selection mode. In an embodiment the cell is a CAG cell or a non-CAG cell. In an embodiment, the cell detector (112) selects the cell of the PLMN to camp in response receiving a signal from the base station corresponds to the cell. Further, the CAG information controller (110) is configured to initiates a Non-Access Stratum (NAS) procedure (e.g. Registration procedure) by sending a registration request message to the AMF (200) through the cell for registering to the network. In an embodiment, the registration request message is an initial registration request or a mobility and periodic registration update request message. In an embodiment, the registration controller (111) sends the registration request message to the AMF (200) through the cell for registering to the network In another embodiment, the registration controller (111) selects and camps on the CAG cell of the PLMN to initiate the NAS procedure (e.g. Registration Procedure) with the network even though the UE (100) is not having CAG IDs. In an embodiment, the CAG cell broadcasts the CAG IDs to the UE (100) while camping on the CAG cell. Further, the registration controller (111) selects a CAG ID from the broadcasted CAG IDs. Further, the registration controller (111) sends the registration request message includes the selected CAG ID to the network for registration.

The CAG information controller (210) is configured to receive the registration request message from the UE (100) through the cell. In an embodiment, the registration controller (211) receives the registration request message from the UE (100) through the cell. The CAG information controller (210) is configured to determine that the UE (100) is unauthorized to the cell when the cell is the CAG cell. In an embodiment, the authorization controller (212) determines that the UE (100) is unauthorized to the cell when the cell is the CAG cell. In an example scenario the UE (100) camps on the CAG cell, where the UE (100) is not allowed to access the CAG cell as per the current CAG subscription of the UE (100) in the network i.e. the CAG identity or identities broadcasted by the CAG cell is in the Allowed CAG ID list in the network. This situation happens when the CAG information list stored in the UE (100) and the network are not synchronized or the user insert the UICC (300) into the UE (100) (e.g. brand new UE or the user removes UICC (300) from one UE and insert in other UE) which does not have CAG information list of the USIM. Further, the UE (100) sends the registration request message to the AMF (200) through the CAG cell. Further, the AMF (200) identifies that the UE (100) sends the registration request message through the CAG cell that is not allowed to access by the UE (100) based on the CAG subscription of the UE (100) i.e. the CAG identity or identities broadcasted by the CAG cell is in the Allowed CAG ID list in the network. Hence, the AMF (200) determines that the UE (100) is unauthorized to access the CAG cell due to receiving the registration request message through the CAG cell that is not allowed to access by the UE (100).

In another embodiment, the CAG information controller (210) is configured to determine that the UE (100) is authorized to access the network only through the CAG cell when the cell is the non-CAG cell. In an embodiment, the authorization controller (212) determines that the UE (100) is authorized to access the network only through the CAG cell when the cell is the non-CAG cell. In an example scenario, the UE (100) camps on the non-CAG cell, where the UE (100) is a CAG only UE (i.e. the UE (100) is only allowed to access the network through the CAG cell) as per the CAG subscription. This scenario will happen when the CAG information list stored in the UE (100) and network are not in sync (i.e. according to CAG information list stored in the UE (100), the UE (100) is allowed to access the 5GS through the CAG cell as well the non-CAG cell, but in the network side the UE (100) is allowed to access 5GS only via the non-CAG cell according to the updated CAG subscription. The updated CAG subscription is not yet updated to the UE (100)). Further, the UE (100) sends the registration request message to the AMF (200) through the non-CAG cell. Further, the AMF (200) identifies that the UE (100) should send the registration request message through the CAG cell based on the CAG subscription of the UE (100), and hence the AMF (200) determines that the UE (100) is authorized to access the network through the CAG cell.

The registration controller (211) sets a 5GMM cause value to #76 for indicating that the UE (100) is not authorized for the CAG call or authorized for the CAG cells only. The CAG information controller (210) is configured to send the registration reject message includes a CAG information list to the UE (100). In an embodiment, the CAG information list is a list of the CAG information. The CAG information list includes either zero entries or at least one of a Public Land Mobile Network Identifier (PLMN ID), an allowed CAG list includes zero or more CAG IDs, and an indication to indicate that the UE (100) is only allowed to access the network through the CAG cell. A CAG only indication is an example for the indication. In an embodiment, the registration reject message is a NAS message or an Access Stratum (AS) message. In an embodiment, registration controller (211) sends the registration reject message to the UE (100).

In an embodiment, the CAG information list is included in a CAG information list information element in the registration reject message. Contents in the registration reject message is given in Table 1.

CAG list or the CAG only indication in the NAS message or AS message to the UE (100).

The CAG information controller (110) is configured to store the CAG information list in the registration reject message to the UICC (300) or the memory (120). In an embodiment, the registration controller (111) stores the CAG information list in the registration reject message to the UICC (300) or the memory (120). In an embodiment, the CAG information list is stored in an elementary file in the UICC (300). In an embodiment, the registration controller (111) stores the CAG information list to the UICC (300) when the elementary file is available at the UICC (300). When the elementary file is unavailable at the UICC (300), then the registration controller (111) stores the CAG information list at the memory (120). The CAG information controller (110) is configured to select and camp on the CAG cell based on the CAG information list in the registration reject message. In an embodiment, the cell detector (112) selects and camps on the CAG cell based on the CAG information list. The CAG information controller (110) is configured to send a registration request message to the

TABLE 1

Contents in the registration reject message

| Information Element Identifier (IEI) | Information Element (IE) | Type/ Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration reject message identity | Message type 9.7 | M | V | 1 |
| | 5GMM cause | 5GMM cause 9.11.3.2 | M | V | 1 |
| 5F | T3346 value | GPRS timer 2 9.11.2.4 | O | TLV | 3 |
| 16 | T3502 value | GPRS timer 2 9.11.2.4 | O | TLV | 3 |
| 78 | EAP message | EAP message 9.11.2.2 | O | TLV-E | 7-1503 |
| 69 | Rejected NSSAI | Rejected NSSAI 9.11.3.46 | O | TLV | 4-42 |
| TBD | CAG information list | CAG information list 9.11.3.18A | O | TLV-E | 3-n |

The CAG information controller (110) is configured to receive the registration reject message from the AMF (200) through the cell. In an embodiment, the registration controller (111) receives the registration reject message from the AMF (200) through the cell.

In an embodiment, when the UE (100) is the CAG only UE and the UE (100) does not have the CAG subscription, then the AMF (200) provides the registration reject message with zero entry in the allowed CAG list to the UE (100).

In an embodiment, the registration controller (111) indicates to the AMF (200) that the allowed CAG list is empty or the allowed CAG list is unavailable at the UE (100). Further, the registration controller (211) sends the allowed AMF (200) through the selected CAG cell for registering to the network. In an embodiment, registration controller (111) sends the registration request message to the AMF (200) through the selected CAG cell for registering to the network.

The CAG information controller (210) is configured to determine that the UE (100) is authorized to the CAG cell, in response to receiving the registration request message from the UE (100) through the CAG cell. In an embodiment, the authorization controller (212) determines that the UE is authorized to the CAG cell, in response to receiving the registration request message from the UE (100) through the CAG cell. The CAG information controller (210) is configured to register the CAG subscription of the UE (100) in response to determining that the UE (100) is authorized to the CAG cell. In an embodiment, the registration controller (211) registers the CAG subscription of the UE (100) in response to determining that the UE (100) is authorized to the CAG cell. The CAG information controller (210) is configured to send a registration accept message to the UE (100), in response to registering the UE (100) for accessing the CAG services. In an embodiment, the registration controller (211) sends the registration accept message to the UE (100). In an embodiment, the registration accept message includes the CAG only indication. The CAG information controller (110) is configured to allow the UE (100) to access the CAG services, in response to receiving the registration accept message from the AMF (200). In an embodiment, the registration controller (111) allows the UE (100) to access the CAG services in response to receiving the registration accept message from the AMF (200).

In an embodiment, when the UE (100) is the CAG only UE and the UE (100) does not have the CAG subscription, then the AMF (200) provides the registration accept message with zero entry in the allowed CAG list to the UE (100).

In another embodiment, the registration controller (111) reinitiates the NAS procedure by sending the registration request message to the AMF (200) when the allowed CAG list is empty or the allowed CAG list is unavailable at the UE (100). In an embodiment, the registration controller (111) reinitiates the NAS procedure after a time duration for a specific number of times or indefinitely. In an embodiment, the time duration or/and the specific number of times is indicated in the NAS message (e.g. registration reject message) by the AMF (200) or pre-configured in the UE (100) based on UE implementation. In an embodiment, the registration controller (111) stops sending the registration request message, in response to not receiving any CAG related subscription from the AMF (200) after sending the registration request message for the specific number of times.

In an embodiment, the registration controller (111) does not find a suitable CAG cell corresponds to CAG IDs in the allowed CAG list is available for the UE (100) to register to the network, in response to receiving the CAG information list. Further, the registration controller (111) deregisters the CAG subscription locally or sends a deregistration request on the cell of the PLMN for deregistration.

In another embodiment, when the AMF (200) receives the registration request message through a first CAG cell and determines that the CAG subscription of at least one second CAG cell, where the UE (100) does not have any CAG subscription in the first CAG cell, then the AMF (200) accepts the registration request message. Further, AMF (200) sends the registration accept message includes the allowed CAG list and/or the CAG only indication.

In another embodiment, when the AMF (200) receives registration request message through the non-CAG cell and the AMF (200) determines that the UE (100) is the CAG only UE, then the AMF (200) accepts the registration request message. Further, AMF (200) sends the registration accept message includes the allowed CAG list and/or the CAG only indication.

In another embodiment, when the UE (100) camps on the non-CAG cell or a non-Stand-alone Non-Public Network (non-SNPN) cell and the UE (100) supports a CAG related feature or a SNPN related feature, then the UE (100) includes capability information of the UE (100) that the UE (100) supports the CAG related feature or the SNPN related feature in the AS message during an existing Radio Resource Control (RRC) connection procedure (e.g. RRC connection establishment, RRC resume procedure or RRC re-establishment) or in the NAS message (e.g. Registration Request or a Service Request). In response to determining that the UE (100) supports the CAG related feature from the capability information, the AMF (200) sends the CAG information list to the UE (100) in the NAS message (e.g. Registration Accept). In response to determining that the UE (100) supports the SNPN related feature from the capability information, the AMF (200) sends SNPN related information such as a UE related SNPN subscription, subscriber identifiers and credentials for one or multiple SNPNs identified, etc. to the UE (100) in the NAS message or an Open Mobile Alliance-Device Management (OMA-DM) message or other UE configuration update procedure.

The memory (120, 220) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory (120, 220) may, in some examples, be considered a non-transitory storage medium. The term "non-transitory" may indicate that the storage medium is not embodied in a carrier wave or a propagated signal. However, the term "non-transitory" should not be interpreted that the memory (120, 220) is non-movable. In some examples, the memory (120, 220) can be configured to store larger amounts of information than the memory (120, 220). In certain examples, a non-transitory storage medium may store data that can, over time, change (e.g., in Random Access Memory (RAM) or cache).

The processor (130) is configured to execute instructions stored in the memory (120). The communicator (140) is configured to communicate internally between hardware components in the UE (100). Further, the communicator (140) is configured to facilitate the communication between the UE (100) and other devices (e.g. base station, UICC (300), etc.)

The processor (230) is configured to execute instructions stored in the memory (220). The communicator (240) is configured to communicate internally between hardware components in the AMF (200). Further, the communicator (240) is configured to facilitate the communication between the AMF (200) and other devices (e.g. the base station, etc.).

Although the FIG. 1 shows the hardware components of the system but it is to be understood that other embodiments are not limited thereon. In other embodiments, the system may include less or more number of components. Further, the labels or names of the components are used only for illustrative purpose and does not limit the scope of the invention. One or more components can be combined together to perform same or substantially similar function for managing the CAG information.

FIG. 2A is a flow diagram A200 illustrating a method of obtaining the CAG information list by the UE (100) from the AMF (200), according to an embodiment as disclosed herein. At step A201, the method includes sending the registration request message to the AMF (200) through the cell for registering to the network. In an embodiment, the method allows the registration controller (111) to send the registration request message to the AMF (200) through the cell for registering to the network. At step A202, the method includes receiving the registration reject message includes the CAG information list from the AMF (200). In an embodiment, the method allows the registration controller (111) to receive the registration reject message includes CAG information list from the AMF (200). At step A203, the method includes storing the CAG information list.

In an embodiment, the method allows the registration controller (111) to store the CAG information list to the memory (120) of the UE (100). In another embodiment, the method allows the registration controller (111) to store the CAG information list to the UICC (300). At step A204, the method includes selecting the CAG cell based on the CAG information list received in the registration reject message. In an embodiment, the method allows the cell detector (112) to select the CAG cell based on the CAG information list received in the registration reject message. At step A205, the method includes sending the registration request message to the AMF (200) through the CAG cell. In an embodiment, the method allows the registration controller (111) to send the registration request message to the AMF (200) through the CAG cell. At step A206, the method includes receiving the registration accept message from the AMF (200). In an embodiment, the method allows the registration controller (111) to receive the registration accept message from the AMF (200).

The various actions, acts, blocks, steps, or the like in the flow diagram A200 may be performed in the order presented, in a different order or simultaneously. Further, in some embodiments, some of the actions, acts, blocks, steps, or the like may be omitted, added, modified, skipped, or the like without departing from the scope of the invention.

FIG. 2B is a flow diagram B200 illustrating a method for providing the CAG information list by the AMF (200) to the UE (100), according to an embodiment as disclosed herein. At step B201, the method includes receiving the registration request message from the UE (100) through the cell for registering to the network. In an embodiment, the method allows the registration controller (211) to receive the registration request message from the UE (100) through the cell for registering to the network. At step B202, the method includes determining that the UE (100) is one of unauthorized to the cell when the cell is the CAG cell, and authorized to access the network only through the CAG cell when the cell is the non-CAG cell. In an embodiment, the method allows the authorization controller (212) to determine that the UE (100) is one of unauthorized to the cell when the cell is the CAG cell, and authorized to access the network only through the CAG cell when the cell is the non-CAG cell. At step B203, the method includes sending the registration reject message includes the CAG information list to the UE (100). In an embodiment, the method allows the registration controller (211) to send the registration reject message includes the CAG information list to the UE (100).

The various actions, acts, blocks, steps, or the like in the flow diagram B200 may be performed in the order presented, in a different order or simultaneously. Further, in some embodiments, some of the actions, acts, blocks, steps, or the like may be omitted, added, modified, skipped, or the like without departing from the scope of the invention.

FIG. 3 is a sequential diagram illustrating signaling between the AMF (200) and the UE (100) for managing the CAG information to register the UE (100) to the network, according to an embodiment as disclosed herein. In response to coupling the UICC (300) having CAG subscription with the UE (100) for first time, the UE (100) selects the non-CAG cell and camps on the non-CAG cell. At step S301, the UE (100) sends the registration request message to the AMF (200) through the non-CAG cell for registering to the network. At step S302, the AMF (200) determines that the UE (100) is authorized to access the network only through the CAG cell. At step S303, the AMF (200) rejects the request from the UE (100) by sending from the registration reject message includes the allowed CAG list, and optionally the CAG only indication to the UE (100). At step S304, in response to receiving registration reject message, the UE (100) stores the allowed CAG list to the UICC (300) or the memory (120). In an embodiment, the UE (100) determines that the UE (100) is only allowed to access the network through the CAG cell, when the CAG only indication is present in the registration reject message.

At step S305, the UE selects and camps on the CAG cell corresponds to the CAG ID in the allowed CAG list. At step S306, the UE (100) sends the registration request message to the AMF (200) through the CAG cell for registering to the network. At step S307, the AMF (200) determines that the UE (100) is authorized to the CAG cell through which the UE (100) sends the request for registration. At step S308, the AMF (200) registers the UE (100) for accessing the CAG services and sends the registration accept message, in response to determining that the UE (100) is authorized to the CAG cell. In an embodiment, the registration accept message includes the CAG only indication to the UE (100). In response to receiving registration accept message, the UE (100) initiates to access the CAG services.

Unlike existing methods and systems, the proposed method allows the UE (100) to obtain the CAG information includes the allowed CAG list and the CAG only indication as a part of the registration reject message from the AMF (200). The UE (100) uses the CAG information to immediately select and camp on the CAG cell corresponds to the CAG ID in the allowed CAG list and uses the CAG service as soon as possible.

Moreover, the proposed method allows the UE (100) to immediately know that the UE (100) is the allowed to access the network through the CAG cell by providing the CAG only indication in the registration reject message or the registration accept message to the UE (100). Therefore, the UE (100) does not reselect or select the non-CAG cell and does not lose the CAG services.

Figure 4:
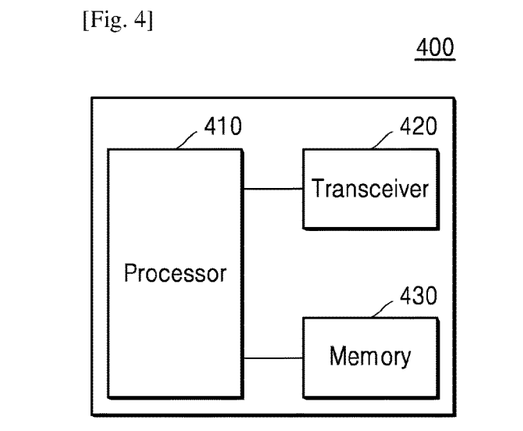
FIG. 4 schematically illustrates a Access and Mobility Management Function (AMF) according to embodiments of the present disclosure.

FIG. 4 schematically illustrates a Access and Mobility Management Function (AMF) according to embodiments of the present disclosure.

Referring to the FIG. 4, the AMF 400 may include a processor 410, a transceiver 420 and a memory 430. However, all of the illustrated components are not essential. The AMF 400 may be implemented by more or less components than those illustrated in FIG. 4. In addition, the processor 410 and the transceiver 420 and the memory 430 may be implemented as a single chip according to another embodiment.

The AMF 400 may correspond to AMF 200 described above. For example, the AMF 400 may correspond to the AMF 200 illustrated in FIG. 1 and FIG. 3.

The aforementioned components will now be described in detail.

The processor 410 may include one or more processors or other processing devices that control the proposed function, process, and/or method. Operation of the AMF 400 may be implemented by the processor 410.

The transceiver 420 may include a RF transmitter for up-converting and amplifying a transmitted signal, and a RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wired and wireless network and output the signal to the processor 410.

The transceiver 420 may transmit a signal output from the processor 410 through the wireless channel.

The memory 430 may store the control information or the data included in a signal obtained by the AMF 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

The embodiments disclosed herein can be implemented using at least one software program running on at least one hardware device and performing network management functions to control the elements.

Figure 5:
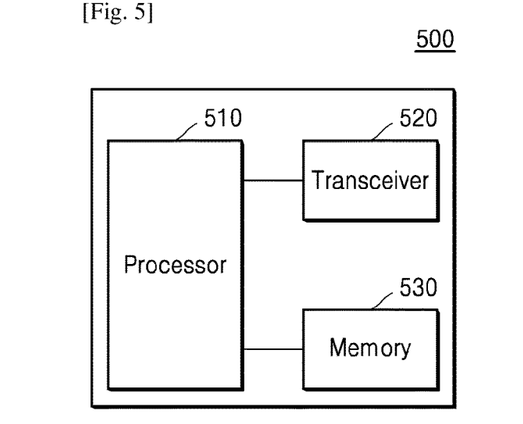
FIG. 5 illustrates a user equipment (UE) according to embodiments of the present disclosure.

FIG. 5 illustrates a user equipment (UE) according to embodiments of the present disclosure.

Referring to the FIG. 5, the UE 2200 may include a processor 510, a transceiver 520 and a memory 530. However, all of the illustrated components are not essential. The UE 2200 may be implemented by more or less components than those illustrated in FIG. 5. In addition, the processor 510 and the transceiver 520 and the memory 530 may be implemented as a single chip according to another embodiment.

The UE 500 may correspond to the UE described above. For example, UE 500 may correspond to UE 100 illustrated in FIG. 1 and FIG. 3.

The aforementioned components will now be described in detail.

The processor 510 may include one or more processors or other processing devices that control the proposed function, process, and/or method. Operation of the UE 500 may be implemented by the processor 510.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the UE 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for managing closed access group (CAG), performed by a user equipment (UE), the method comprising:
   transmitting, to an access and mobility management function (AMF), a registration request message for registering to a network; and
   receiving, from the AMF, a registration reject message, wherein the registration reject message includes a CAG information list based on identifying that the UE is authorized to access the network via a CAG cell only, wherein the CAG information list comprises a public land mobile network identifier PLMN ID), an allowed CAG list and an indication that the UE is only authorized to access the network via the CAG cell.

2. The method of claim 1, further comprising reselecting a cell for registering to the network based on the CAG information list.

3. A method for managing a closed access group (CAG), performed by an access and mobility management function (AMF), the method comprising:
   receiving, from a user equipment (UE), a registration request message for registering to a network;
   identifying that the UE is authorized to access the network via a CAG cell only; and
   transmitting, to the UE, a registration reject message, wherein the registration reject message includes a CAG information list based on the identifying that the UE is authorized to access the network via the CAG cell only, wherein the CAG information list comprises a public land mobile network identifier (PLMN ID), an allowed CAG list and an indication that the UE is only authorized to access the network via the CAG cell.

4. A user equipment (UE) for managing a closed access group, the UE comprising:
   a transceiver;
   a memory; and
   at least one processor coupled with the transceiver and the memory and configured to:
      transmit, to an access and mobility management function (AMF), a registration request message for registering to a network, and
      receive, from the AMF, a registration reject message,
   wherein the registration reject message includes a CAG information list based on identifying that the UE is authorized to access the network via a CAG cell only, and
   wherein the CAG information list comprises a public land mobile network identifier (PLMN ID), an allowed CAG list and an indication that the UE is only authorized to access the network via the CAG cell.

5. The UE of claim 4, wherein the at least one processor is further configured to reselect a cell for registering to the network based on the CAG information list.

6. An access and mobility management function (AMF) for managing closed access group (CAG), the AMF comprising:
   a transceiver;
   a memory;
   at least one processor coupled with the transceiver and the memory and configured to:

receive, from a user equipment (UE), a registration request message for registering to a network;

identify that the UE is authorized to access the network via a CAG cell only; and transmit, to the UE, a registration reject message, wherein the registration message includes CAG information list based on the identifying that the UE is authorized to access the network via the CAG cell only, wherein the CAG information list comprises a public land mobile network identifier (PLMN ID), an allowed CAG list and an indication that the UE is only authorized to access the network via the CAG cell.

* * * * *